US009096746B2

(12) United States Patent
Mikawa et al.

(10) Patent No.: US 9,096,746 B2
(45) Date of Patent: Aug. 4, 2015

(54) POLYOLEFIN RESIN COMPOSITION AND APPLICATIONS THEREOF

(75) Inventors: Nobuhisa Mikawa, Chiba (JP); Motoyasu Yasui, Chiba (JP); Akiyoshi Taguchi, Ichihara (JP); Kazuto Sugiyama, Ichihara (JP); Yasuhiro Kai, Otake (JP); Kenji Sugimura, Iwakuni (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/240,900

(22) PCT Filed: Aug. 29, 2012

(86) PCT No.: PCT/JP2012/071764
§ 371 (c)(1),
(2), (4) Date: Feb. 25, 2014

(87) PCT Pub. No.: WO2013/031795
PCT Pub. Date: Mar. 7, 2013

(65) Prior Publication Data
US 2014/0221516 A1 Aug. 7, 2014

(30) Foreign Application Priority Data
Aug. 31, 2011 (JP) .................................. 2011-188498

(51) Int. Cl.
*C08F 8/00* (2006.01)
*C08L 23/00* (2006.01)
*C08L 23/06* (2006.01)
*C08L 23/20* (2006.01)
*H01M 2/16* (2006.01)
*C08J 5/18* (2006.01)
*B01D 69/02* (2006.01)
*B01D 71/26* (2006.01)

(52) U.S. Cl.
CPC .................. *C08L 23/06* (2013.01); *B01D 69/02* (2013.01); *B01D 71/26* (2013.01); *C08J 5/18* (2013.01); *C08L 23/20* (2013.01); *H01M 2/1653* (2013.01); *C08J 2323/06* (2013.01); *C08L 2207/068* (2013.01)

(58) Field of Classification Search
CPC ......... C08L 23/20; C08L 23/02; C08L 23/06; B01D 69/02; B01D 7/26; H01M 2/1653; C08J 5/18
USPC .................... 525/191, 240; 521/134
See application file for complete search history.

(56) References Cited

U.S. PATENT DOCUMENTS

| 6,376,032 | B1 | 4/2002 | Clarke et al. |
| 7,807,287 | B2 | 10/2010 | Kono et al. |
| 2002/0054969 | A1 | 5/2002 | Clarke et al. |
| 2002/0106557 | A1 | 8/2002 | Fraser-Bell et al. |
| 2004/0039115 | A1 | 2/2004 | Ishida |
| 2008/0057388 | A1 | 3/2008 | Kono et al. |
| 2008/0220193 | A1 | 9/2008 | Tohi et al. |
| 2009/0117453 | A1 | 5/2009 | Kikuchi et al. |
| 2009/0253032 | A1 | 10/2009 | Takita et al. |
| 2009/0286161 | A1 | 11/2009 | Takita et al. |
| 2010/0021808 | A1 | 1/2010 | Takita et al. |
| 2010/0209745 | A1 | 8/2010 | Kimishima |
| 2011/0207840 | A1* | 8/2011 | Abe et al. .................. 521/62 |

FOREIGN PATENT DOCUMENTS

| EP | 2 351 790 A1 | 8/2011 |
| JP | 63-230751 A | 9/1988 |
| JP | 7-60084 A | 3/1995 |
| JP | 11-506147 A | 6/1999 |
| JP | 2003-105022 A | 4/2003 |
| JP | 2007-23171 A | 2/2007 |
| JP | 2007-302853 A | 11/2007 |
| JP | 2008-81513 A | 4/2008 |
| JP | 2010-502471 A | 1/2010 |
| JP | 2010-77336 A | 4/2010 |
| JP | 2010-538097 A | 12/2010 |
| JP | 2011-171049 A | 9/2011 |
| JP | 2011-184671 A | 9/2011 |
| WO | WO 03/022920 A1 | 3/2003 |
| WO | WO 2006/137540 A1 | 12/2006 |
| WO | WO 2010/058789 A1 | 5/2010 |

OTHER PUBLICATIONS

International Search Report (PCT/ISA/210) mailed on Nov. 13, 2012, by the Japanese Patent Office as the International Searching Authority for International Application No. PCT/JP2012/071764.
Extend European Search Report issued in corresponding European Application No. 12828035 on Dec. 23, 2014 (4 pages).

* cited by examiner

*Primary Examiner* — Nathan M Nutter
(74) *Attorney, Agent, or Firm* — Buchanan, Ingersoll & Rooney PC

(57) ABSTRACT

There are provided a polyolefin resin composition having excellent mechanical properties and thermal resistance; a film formed of the polyolefin resin composition, which has excellent mechanical properties and thermal resistance and which is less likely to suffer from fisheyes; a microporous membrane having excellent permeability and shutdown properties in addition to the above-mentioned physical properties; and applications thereof. Such objects are accomplished by a polyolefin resin composition containing an ultra-high molecular weight ethylene polymer (A), a 4-methyl-1-pentene polymer or 3-methyl-1-pentene polymer (B), and a polymer of an olefin having 2 to 12 carbon atoms (C) at an intended ratio.

13 Claims, No Drawings

POLYOLEFIN RESIN COMPOSITION AND APPLICATIONS THEREOF

TECHNICAL FIELD

The present invention relates to a polyolefin resin composition containing an ultra-high molecular weight ethylene polymer (A), a 4-methyl-1-pentene polymer or 3-methyl-1-pentene polymer (B), and at least one of polymers of olefins having 2 to 12 carbon atoms (C). In particular, the present invention relates to a polyolefin resin composition which enables production of a microporous membrane having excellent mechanical properties, thermal resistance, and appearance; a microporous membrane formed of such a resin composition; and applications thereof.

BACKGROUND ART

Polyolefin microporous membranes have been widely employed, for example, as battery separators used in lithium secondary batteries, nickel-hydrogen batteries, nickel-cadmium batteries, and polymer batteries; separators used in electrolytic capacitors; a variety of filters such as reverse osmosis filtration membranes, ultrafiltration membranes, and microfilter membrane; and moisture-permeable waterproof clothes and medical materials.

In the case where a polyolefin microporous membrane is used as a battery separator, particularly as a separator of a lithium ion battery, the properties thereof have large effects on the characteristics, productivity, and safety of the battery. Hence, the polyolefin microporous membrane needs to have properties such as excellent mechanical properties, thermal resistance, appearance, permeability, dimensional stability, shutdown properties, and meltdown properties. If a polyolefin microporous membrane having a low mechanical strength is used as a battery separator, for instance, short circuit between electrodes may occur with the result that the battery voltage is lowered.

Since typical microporous membranes made of polyethylene alone generally have a low mechanical strength, a microporous membrane formed of ultra-high molecular weight polyethylene has been proposed for an enhancement in the mechanical strength.

In recent years, however, regarding the properties of separators, a demand for safety has been highly increased in addition to mechanical strength and permeability. In particular, the electrodes of a lithium ion battery repeatedly expand and contract by electric charge and discharge. In this case, shutdown properties which enable prompt shutdown of the battery circuit when a large electric current flows because of, for example, external short circuit are needed. Polyethylene microporous membranes produced by a method involving formation of pores through stretching or by a phase separation method have been practically used as the separators of lithium ion batteries; this is because the membranes are melted at a relatively low temperature owing to heat generated by the short-circuit current to close the micropores with the result that the battery circuits can be shut down, and an increase in temperature can be therefore suppressed after the micropores are closed.

In addition to closing micropores at a relatively low temperature, however, the microporous membranes used in the lithium ion batteries also need to maintain the shape thereof when the temperature is increased to a high level. In the case where the shape is not maintained, electrodes directly contact each other with the result that meltdown is caused, leading to a dangerous state. The battery separator formed of polyethylene has a low melting point and is therefore unsatisfactory in terms of the meltdown temperature. Combined use of polyolefin having a high melting point has been proposed for improvement of such meltdown properties.

In Patent Literature 1, a polyolefin microporous membrane formed of a composition containing polyethylene and polymethylpentene has been proposed. In particular, in the disclosure in Patent Literature 1, a mixture of high-density polyethylene and polymethylpentene (polyolefin resin) is melt-kneaded and then stretched at a predetermined temperature to produce the polyolefin microporous membrane; however, the produced microporous membrane has insufficient strength and thermal resistance. Furthermore, poor compatibility of high-density polyethylene with polymethylpentene causes problems in which a film is not sufficiently stretched and in which unmelted part of the resin remains to cause fisheyes with the result that the appearance of a film is impaired. Comparing part of the membrane corresponding to the residual unmelted resin (fisheyes) with the other part, pores are not sufficiently opened, and ion permeability is insufficient in the electric charge and discharge of a battery. In the case where a separator has an uneven ion permeability, not only electric charge and discharge become inefficient, but also dendrite is likely to be selectively generated at part of an electrode facing part of the separator at which ion permeability is high. If the dendrite grows and breaks the separator, external shortcut is caused, and large amount of current therefore flows, which is significantly dangerous. Hence, the fisheyes in separators need to be reduced as much as possible.

In Patent Literature 2, a microporous membrane has been proposed, in which a layered structure which includes a layer mainly containing polyethylene and a layer mainly containing polyethylene and polypropylene having a predetermined molecular weight enables development of thermal resistance. Production of the microporous membrane having a layered structure, however, costs expensive capital investment, involves a complicated production process, and is highly technical, which causes a problem in which such a microporous membrane is less likely to become popular in the market.

CITATION LIST

Patent Literature

PTL 1: Japanese Unexamined Patent Application Publication No. 7-60084

PTL 2: Japanese Unexamined Patent Application Publication (Translation of PCT Application) No. 2010-502471

SUMMARY OF INVENTION

Technical Problem

In view of the above-mentioned various problems in background art, it is an object of the present invention to provide a polyolefin resin composition having excellent mechanical properties and thermal resistance. Furthermore, it is another object of the present invention to provide a film formed of such a polyolefin resin composition through a simple process for producing a monolayer film, the film having excellent mechanical properties and thermal resistance and being less likely to suffer from fisheyes. Moreover, it is another object of the present invention to provide a microporous membrane having an excellent permeability and shutdown properties in addition to the above-mentioned properties and to provide applications thereof.

Solution to Problem

The inventors have conducted intensive studies to attain the above-mentioned objects and found that a polyolefin resin composition containing predetermined amounts of an ultra-high molecular weight ethylene polymer (A) having a specific intrinsic viscosity, a 4-methyl-1-pentene polymer or 3-methyl-1-pentene polymer (B), and a polymer of an olefin having 2 to 12 carbon atoms (C), which is different from polymers selected as the polymers (A) and (B), has excellent mechanical properties and thermal resistance and enables production of a film and microporous membrane which have excellent mechanical properties and thermal resistance and which are less likely to suffer from fisheyes, thereby accomplishing the present invention.

In particular, the polyolefin resin composition of the present invention contains (i) 50 to 85 parts by weight of an ultra-high molecular weight ethylene polymer (A) having a intrinsic viscosity [η] of 3.5 to 35 dl/g, the intrinsic viscosity [η] being measured in decalin at 135° C. in accordance with ASTM D4020;

(ii) 10 to 60 parts by weight, preferably 10 to 45 parts by weight, and more preferably 10 to 40 parts by weight of a 4-methyl-1-pentene polymer or 3-methyl-1-pentene polymer (B); and (iii) 0.1 to 20 parts by weight of a polymer of an olefin having 2 to 12 carbon atoms (C), the polymer (C) being different from polymers selected as the ultra-high molecular weight ethylene polymer (A) and 3-methyl-1-pentene polymer (B) (the total of (A), (B), and (C) is 100 parts by weight).

It is preferred that the polyolefin resin composition of the present invention further contain 0.001 to 20 parts by weight of an olefin polymer (D) relative to 100 parts by weight of the total of (A), (B), (C), and (D), the olefin polymer (D) having a number average molecular weight (Mn) of 500 to 10000 measured by gel permeation chromatography (GPC) and being different from polymers selected as the ultra-high molecular weight ethylene polymer (A), 3-methyl-1-pentene polymer (B), and polymer of an olefin having 2 to 12 carbon atoms (C).

It is preferred that the MFR of the polymer of an olefin having 2 to 12 carbon atoms (C) range from 0.001 to 20 g/10 min, the MFR being measured at a load of 2.16 kg and 190° C. in accordance with ASTM D1238.

It is preferred that the polyolefin resin composition be used for a film and a microporous membrane. Furthermore, it is preferred that the microporous membrane be particularly used for a battery separator.

Advantageous Effects of Invention

The polyolefin resin composition of the present invention has excellent mechanical properties and thermal resistance. The film formed of the polyolefin resin composition has excellent mechanical properties and thermal resistance inherent in the polyolefin resin composition; in addition, the specific polymer (C) contained in the polyolefin resin composition enables the film to have properties such as excellent appearance with reduced fisheyes.

The microporous membrane formed of the polyolefin resin composition of the present invention has, in addition to the above-mentioned properties, excellent permeability and shutdown properties and thus can be suitably employed as, for example, a battery separator used in an lithium ion battery.

DESCRIPTION OF EMBODIMENTS

A polyolefin resin composition and a film, microporous membrane, and battery separator formed of the polyolefin resin composition according to the present invention will now be specifically described.

<Polyolefin Resin Composition>

The polyolefin resin composition of the present invention contains predetermined amounts of a specific ultra-high molecular weight ethylene polymer (A), a 4-methyl-1-pentene polymer or 3-methyl-1-pentene polymer (B), and a polymer of an olefin having 2 to 12 carbon atoms (C). In addition, the polyolefin resin composition may optionally contain an olefin polymer (D) having a specific number average molecular weight (Mn) which will be described later. Each component will now be described in detail.

[Ultra-high Molecular Weight Ethylene Polymer (A)]

The ultra-high molecular weight ethylene polymer (A) that is a component of the polyolefin resin composition of the present invention includes an ethylene homopolymer and copolymers of ethylene and at least one α-olefin selected from α-olefins having 3 to 12 carbon atoms, such as propylene, 1-butene, 1-pentene, 1-hexene, 1-octene, 1-decene, 1-dodecene, 4-methyl-1-pentene, and 3-methyl-1-pentene. The term "polymer" hereinafter comprehends a copolymer unless otherwise specified. Such polymers may be used alone or in combination.

In the case where the ultra-high molecular weight ethylene polymer (A) that is an ethylene homopolymer or a copolymer of ethylene and the above-mentioned α-olefin is a polymer which primarily contains ethylene in an amount of not less than 50 weight %, preferably not less than 70 weight %, and more preferably not less than 90 weight %, a microporous membrane formed of the polyolefin resin composition has excellent permeability and shutdown properties, and use of such a polymer is therefore preferred.

The lower limit of the intrinsic viscosity [η] of the ultra-high molecular weight ethylene polymer (A), which is measured in decalin at 135° C. in accordance with ASTM D4020, is 3.5 dl/g, preferably 4.0 dl/g, more preferably 5.0 dl/g, further preferably 8.0 dl/g, and especially preferably 10.0 dl/g. The upper limit of the intrinsic viscosity [η] is 35 dl/g, preferably 30 dl/g, more preferably 26 dl/g, further preferably 23 dl/g, still further preferably 20 dl/g, still further preferably 15 dl/g, and most preferably 12 dl/g.

The intrinsic viscosity [η] less than 3.5 dl/g reduces the strength of a film and microporous membrane formed of the polyolefin resin composition. The intrinsic viscosity [η] greater than 35 dl/g makes it difficult to even shape a film and microporous membrane containing the ultra-high molecular weight ethylene polymer (A).

Hence, within the above-mentioned range of the intrinsic viscosity [η] of the ultra-high molecular weight ethylene polymer (A), the mechanical properties and dimensional stability of the ultra-high molecular weight ethylene polymer are further effectively imparted to the polyolefin resin composition.

The ultra-high molecular weight ethylene polymer (A) used as an ingredient of the resin composition of the present invention is preferably in the form of powder. The average particle size of the ultra-high molecular weight ethylene polymer (A) as the ingredient is preferably in the range of 1 μm to 1000 and more preferably 1 μm to 500 μm. The average particle size is a value determined as a 50% particle size in a cumulative particle size distribution obtained in a sieve analysis in accordance with JIS Z 8815.

In the present invention, the ultra-high molecular weight ethylene polymer (A) can be produced by known techniques; however, in a preferred example of production techniques, ethylene and optionally the above-mentioned α-olefin are subjected to multistep polymerization in the presence of a catalyst such that polymer components produced in individual steps have different limiting viscosities as disclosed in International Publication No. WO 03/022920.

[4-methyl-1-pentene Polymer or 3-methyl-1-pentene Polymer (B)]

The 4-methyl-1-pentene polymer or 3-methyl-1-pentene polymer (B) that is a component of the polyolefin resin composition of the present invention is a 4-methyl-1-pentene homopolymer, a 3-methyl-1-pentene homopolymer, a copolymer of 4-methyl-1-pentene and at least one of olefins having 2 to 20 carbon atoms, which is other than 4-methyl-1-pentene, or a copolymer of 3-methyl-1-pentene and at least one of olefins having 2 to 20 carbon atoms, which is other than 3-methyl-1-pentene. The term "polymer" hereinafter comprehends a copolymer unless otherwise specified. The above-mentioned polymers may be used alone or in combination.

Examples of the olefins having 2 to 20 carbon atoms and contained in the copolymers include ethylene, propylene, 1-butene, 1-hexene, 1-heptene, 1-octene, 1-decene, 1-dodecene, 1-tetradecene, 1-hexadecene, 1-heptadecene, 1-octadecene, and 1-eicosene, and these may be used alone or in combination. Among these, α-olefins having 5 to 20 carbon atoms are preferred, and α-olefins having 10 to 20 carbon atoms are more preferred in view of good stiffness and elastic modulus. In particular, 1-decene, 1-dodecene, 1-tetradecene, 1-hexadecene, 1-heptadecene, and 1-octadecene are preferred, and 1-decene, 1-dodecene, and 1-tetradecene are more preferred.

The content of a repeating unit derived from 4-methyl-1-pentene or 3-methyl-1-pentene in the copolymer is normally not less than 80 weight %, preferably in the range of 90 to 99 weight %, and more preferably 95 to 99 weight %. Within the above-mentioned range of the content of the repeating unit derived from 4-methyl-1-pentene or 3-methyl-1-pentene, a film formed of the polyolefin resin composition containing such a copolymer exhibits excellent toughness in stretching thereof.

Among such polymers, 4-methyl-1-pentene polymers are preferred, a 4-methyl-1-pentene homopolymer and copolymers of 4-methyl-1-pentene and at least one of olefins having 2 to 20 carbon atoms, which is other than 4-methyl-1-pentene, are more preferred, and copolymers of 4-methyl-1-pentene and at least one of olefins having 2 to 20 carbon atoms, which is other than 4-methyl-1-pentene, are especially preferred, because they have melting points near the forming temperature of the ultra-high molecular weight ethylene polymer (A).

The MFR of the 4-methyl-1-pentene polymer or 3-methyl-1-pentene polymer (B), which is measured at a load of 5.0 kg and 260° C. in accordance with ASTM D1238, is normally in the range of 0.1 to 220 g/10 min, preferably 0.1 to 20 g/10 min, and more preferably 0.1 to 10 g/10 min. The MFR of the 4-methyl-1-pentene polymer or 3-methyl-1-pentene polymer (B) within such a range contributes to development of good formability of a film made of the polyolefin resin composition containing the polymer (B).

In the present invention, the 4-methyl-1-pentene polymer or 3-methyl-1-pentene polymer (B) can be produced using known catalysts such as a Ziegler-Natta catalyst and a metallocene catalyst; for example, as disclosed in Japanese Unexamined Patent Application Publication No. 2003-105022, the 4-methyl-1-pentene polymer or 3-methyl-1-pentene polymer (B) can be produced, in the presence of a catalyst, through homopolymerization of 4-methyl-1-pentene, homopolymerization of 3-methyl-1-pentene, copolymerization of 4-methyl-1-pentene and at least one of olefins having 2 to 20 carbon atoms, which is other than 4-methyl-1-pentene, and copolymerization of 3-methyl-1-pentene and at least one of olefins having 2 to 20 carbon atoms, which is other than 3-methyl-1-pentene.

The melting point (Tm) of the 4-methyl-1-pentene polymer or 3-methyl-1-pentene polymer (B), which is measured by DSC, is preferably in the range of 220° C. to 370° C., more preferably 220° C. to 270° C., and further preferably 220° C. to 250° C. The melting point (Tm) depends on the types and contents of monomers in the polymer and on tacticity of the polymer and therefore can be adjusted by changing the amount of the raw material monomer to be fed such that the monomer is contained at an intended proportion or by using a polymerization catalyst which enables intended tacticity to be imparted to the polymer.

The 4-methyl-1-pentene polymer or 3-methyl-1-pentene polymer (B) used as a material of the resin composition of the present invention is preferably in the form of powder. The average particle size of the 4-methyl-1-pentene polymer or 3-methyl-1-pentene polymer (B) is preferably in the range of 1 μm to 1000 μm, and more preferably 1 μm to 500 μm.

Since the ultra-high molecular weight ethylene polymer (A) used as a material of the polyolefin resin composition of the present invention is normally in the form of powder, the 4-methyl-1-pentene polymer or 3-methyl-1-pentene polymer (B) used as the material and having an average particle size within the above-mentioned range is further homogeneously mixed with the ultra-high molecular weight ethylene polymer (A) in dry blending; thus, such an average particle size is preferred. In the case where the average particle size is smaller than 1 μm, the particles are likely to aggregate by being electrically charged; hence, this average particle size is not preferred. The average particle size is a value determined as a 50% particle size in a cumulative particle size distribution obtained in a sieve analysis in accordance with JIS Z 8815.

[Polymer of Olefin Having 2 to 12 Carbon Atoms (C)]

The polymer of an olefin having 2 to 12 carbon atoms (C), which is a component of the polyolefin resin composition of the present invention, is a homopolymer of one olefin selected from olefins having 2 to 12 carbon atoms or a copolymer of two or more olefins selected from olefins having 2 to 12 carbon atoms. The term "polymer" hereinafter comprehends a copolymer unless otherwise specified. Such polymers may be used alone or in combination.

In the polyolefin resin composition of the present invention, the polymer of an olefin having 2 to 12 carbon atoms (C) needs to be different from the ultra-high molecular weight ethylene polymer (A) and the 4-methyl-1-pentene polymer or 3-methyl-1-pentene polymer (B). The term "being different" herein refers to a difference in a monomer component, component ratio, and molecular weight between polymers and to being different from polymers selected as the ultra-high molecular weight ethylene polymer (A) and the 4-methyl-1-pentene polymer or 3-methyl-1-pentene polymer (B) in terms of the above-mentioned properties and constitution; hence, all of polymers that can be used as the ultra-high molecular weight ethylene polymer (A) and the 4-methyl-1-pentene polymer or 3-methyl-1-pentene polymer (B) are not excluded from the polymer of an olefin having 2 to 12 carbon atoms (C). Accordingly, for example, in the case where a copolymer of 4-methyl-1-pentene and decene is employed as the 4-methyl-1-pentene polymer or 3-methyl-1-pentene polymer (B), a copolymer of 4-methyl-1-pentene and ethylene can be used as the polymer of an olefin having 2 to 12 carbon atoms (C).

In particular, the olefins having 2 to 12 carbon atoms are ethylene and α-olefins having 3 to 12 carbon atoms; specific examples of the α-olefins having 3 to 12 carbon atoms include linear α-olefins such as propylene, 1-butene, 1-hexene, 1-heptene, 1-octene, 1-decene, and 1-dodecene; and branched α-olefins such as 4-methyl-1-pentene and 3-methyl-1-pentene.

Among these, ethylene and α-olefins having 3 to 8 carbon atoms, such as propylene, 1-butene, 1-hexene, 1-heptene, 1-octene, 4-methyl-1-pentene, and 3-methyl-1-pentene, are preferred, and ethylene and α-olefins having 3 to 6 carbon atoms, such as propylene, 1-butene, 1-hexene, 4-methyl-1-pentene, and 3-methyl-1-pentene, are more preferred.

Specific examples of the polymer of an olefin having 2 to 12 carbon atoms (C) include a copolymer of ethylene and propylene; a copolymer of ethylene and butene; a copolymer of ethylene, propylene, and butene; a copolymer of ethylene and 3-methyl-1-pentene; a copolymer of ethylene and 4-methyl-1-pentene; a propylene homopolymer; a copolymer of propylene and butene; a copolymer of propylene and 4-methyl-1-pentene; and a butene homopolymer.

In particular, in the case where the polymer of an olefin having 2 to 12 carbon atoms (C) is used alone, representative examples of a preferred polymer of an olefin having 2 to 12 carbon atoms (C) include a propylene homopolymer and a copolymer of ethylene and 4-methyl-1-pentene at a molar ratio of 99/1 to 51/49.

In the case where two or more polymers of olefins having 2 to 12 carbon atoms (C) are used in combination, examples of preferred combinations are as follows:

a combination of a copolymer of ethylene and butene at a molar ratio of 99/1 to 51/49 and a copolymer of ethylene and butene at a molar ratio of 1/99 to 49/51, a combination of a copolymer of ethylene and butene at a molar ratio of 99/1 to 51/49 and a copolymer of propylene and butene at a molar ratio of 99/1 to 51/49, a combination of a propylene homopolymer and a copolymer of ethylene and butene at a molar ratio of 99/1 to 51/49, a combination of a propylene homopolymer, a copolymer of ethylene and butene at a molar ratio of 99/1 to 51/49, and a copolymer of ethylene and butene at a molar ratio of 1/99 to 49/51, a combination of a propylene homopolymer, a copolymer of ethylene and propylene at a molar ratio of 1/99 to 49/51, and a copolymer of ethylene and butene at a molar ratio of 1/99 to 49/51, and a combination of a propylene homopolymer, a copolymer of ethylene and propylene at a molar ratio of 1/99 to 49/51, a copolymer of ethylene and butene at a molar ratio of 1/99 to 49/51, and a copolymer of ethylene and butene at a molar ratio of 99/1 to 51/49.

In particular, preferred combinations are as follows: a combination of a propylene homopolymer as the essential component and at least one of a homopolymer of one olefin selected from ethylene and α-olefins having 4 to 12 carbon atoms and a copolymer of two or more olefins selected from ethylene and α-olefins having 3 to 12 carbon atoms and a combination of a copolymer of ethylene and 4-methyl-1-pentene as the essential component and at least one of a homopolymer of one olefin selected from ethylene and α-olefins having 3 to 12 carbon atoms and a copolymer of two or more olefins selected from ethylene and α-olefins having 3 to 12 carbon atoms.

Especially preferred combinations are as follows: a combination of a propylene homopolymer and a copolymer of ethylene and butene at a molar ratio of 99/1 to 51/49 and a combination of a propylene homopolymer, a copolymer of ethylene and propylene at a molar ratio of 1/99 to 49/51, and a copolymer of ethylene and butene at a molar ratio of 1/99 to 49/51.

In the case where two or more polymers (C) of olefins having 2 to 12 carbon atoms are used in combination, the ratio at which the polymers are combined is not specifically limited provided that the objects of the present invention can be accomplished; for instance, on the basis of the assumption that the weight of a first polymer is 1, the proportion of another polymer to be combined therewith is normally in the range of 0.1 to 10, preferably 0.25 to 4, and more preferably 0.4 to 2.5. The term "another polymer to be combined" refers to the other polymer (second polymer) in the case where two polymers are combined and refers to each polymer (second, third, and . . . polymers) to be combined with the first polymer in the case where three or more polymers are combined.

Use of any of the above-mentioned polymers or combined use thereof as the polymer of an olefin having 2 to 12 carbon atoms (C) enables an enhancement in the compatibility between the ultra-high molecular weight ethylene polymer (A) and the 4-methyl-1-pentene polymer or 3-methyl-1-pentene polymer (B) which are generally less compatible with each other. The reason for the enhancement has been still studied; however, it is presumed that the polymer of an olefin (C) easily penetrates and diffuses through both the ultra-high molecular weight ethylene polymer (A) and the 4-methyl-1-pentene polymer or 3-methyl-1-pentene polymer (B) in production of the polyolefin resin composition because the number of the carbon atoms of olefin contained in the polymer of an olefin (C) is similar to those in olefins contained in the components (A) and (B). Owing to such an effect, the polyolefin resin composition of the present invention is evenly melted without residual unmelted polymer; in the case where a film is formed of the polyolefin resin composition, for example, the occurrence of fisheyes can be reduced, which enables the film to have an excellent appearance.

The MFR of the polymer of an olefin having 2 to 12 carbon atoms (C), which is measured at a load of 2.16 kg and 190° C. in accordance with ASTM D1238, is normally in the range of 0.001 to 20 g/10 min, preferably 0.001 to 10 g/10 min, more preferably 0.001 to 5 g/10 min, further preferably 0.001 to 2 g/10 min, and especially preferably 0.001 to 1 g/10 min. The MFR of the polymer of an olefin having 2 to 12 carbon atoms (C) within such a range is preferred in terms of the effect in which the ultra-high molecular weight ethylene polymer (A) and the 4-methyl-1-pentene polymer or 3-methyl-1-pentene polymer (B) become compatible with each other.

The melting point (Tm) of the polymer of an olefin having 2 to 12 carbon atoms (C), which is measured by DSC, is less than 220° C. or unmeasurable. The melting point (Tm) depends on the types and contents of monomers in the polymer and on tacticity of the polymer and therefore can be adjusted by changing the amount of the raw material monomer to be fed such that the monomer is contained at an intended proportion or by using a polymerization catalyst which enables intended tacticity to be imparted to the polymer.

In the present invention, the polymer of an olefin having 2 to 12 carbon atoms (C) can be produced using known catalysts such as a Ziegler-Natta catalyst and a metallocene catalyst; for example, as disclosed in Japanese Unexamined Patent Application Publication No. 2007-302853, the polymer of an olefin having 2 to 12 carbon atoms (C) can be produced through homopolymerization or copolymerization of olefins having 2 to 12 carbon atoms in the presence of a catalyst.

[Olefin Polymer (D) Having Number Average Molecular Weight (Mn) of 500 to 10000 Measured by Gel Permeation Chromatography (GPC)]

In addition to the ultra-high molecular weight ethylene polymer (A), the 4-methyl-1-pentene polymer or 3-methyl-1-pentene polymer (B), and the polymer of an olefin having 2 to 12 carbon atoms (C), the polyolefin resin composition of the present invention can further contain an olefin polymer (D) having a polystyrene-equivalent number average molecular weight (Mn) of 500 to 10000 measured by gel permeation chromatography (GPC).

Examples of the monomer component of the olefin polymer (D) are the same as those in the polymer of an olefin having 2 to 12 carbon atoms (C).

In particular, preferred examples of the olefin polymer (D) include an ethylene homopolymer; a copolymer of ethylene and propylene; a copolymer of ethylene and butene; a copolymer of ethylene, propylene, and butene; a copolymer of ethylene and 3-methyl-1-pentene; a copolymer of ethylene and 4-methyl-1-pentene; a propylene homopolymer; a copolymer of propylene and butene; a copolymer of propylene and 4-methyl-1-pentene; and a butene homopolymer. These polymers may be used alone or in combination.

Among these, an ethylene homopolymer and a copolymer of ethylene and propylene are more preferred, and a copolymer of ethylene and propylene is further preferred.

In the above-mentioned examples of the olefin polymer (D), in the case where the component ratio of two monomers contained in a copolymer is defined as "monomer having fewer carbon atoms/monomer having more carbon atoms", the molar ratio of the two monomers contained in the copolymer is normally in the range of 1/99 to 99/1, preferably 50/50 to 99/1, and more preferably 90/10 to 98/2.

The olefin polymer (D) is preferably a crystalline polymer having a melting point. The lower limit of the melting point is normally 60° C., preferably 80° C., and more preferably 100° C. The upper limit of the melting point is normally 245° C., preferably 220° C., more preferably 200° C., further preferably 160° C., still further preferably 140° C., and especially preferably 130° C.

In measurement of the melting point, a differential scanning calorimeter (DSC) is used, approximately 5 mg of a sample is put on an aluminum pan, and a temperature is increased at a rate of 10° C./min; then, the temperature at the peak top of the endothermic peak resulting from melting of crystal is determined as the melting point.

The polystyrene-equivalent number average molecular weight (Mn) of the olefin polymer (D), which is measured by gel permeation chromatography (GPC), is in the range of 500 to 10000. The number average molecular weight is preferably in the range of 1000 to 7000, and more preferably 3000 to 6000.

The Mn of the olefin polymer (D) within such a range gives the effect in which the extremely high melt viscosity of the ultra-high molecular weight polyethylene (A) can be decreased to an extent which enables kneading to be effectively carried out. Hence, unmelted ultra-high molecular weight polyethylene (A) remaining in the film and microporous membrane formed of the polyolefin resin composition containing the olefin resin (D) can be greatly reduced, so that the occurrence of fisheyes can be suppressed.

In the case where the Mn of the olefin polymer (D) is within the above-mentioned range, the olefin polymer (D) is not removed in a plasticizer-removing process, which will be described later, in production of a microporous membrane containing the polyolefin resin composition of the present invention and remains as a substance contained in the microporous membrane. In the case where temperature inside a battery in which such a microporous membrane is used as a battery separator is excessively increased by, for example, wrong use of the battery, the olefin polymer (D) having a low molecular weight and low melting point and remaining in the microporous membrane can block the micropores of the separator at lower temperature owing to its high fluidity; hence, an effect in which the shutdown temperature of the battery separator formed of such a microporous membrane is lowered can be expected.

From this standpoint, use of an olefin polymer (D) having an Mn less than 500 greatly enlarges the difference in viscosity between the olefin polymer (D) and the ultra-high molecular weight polyethylene (A) with the result that an effect of decreasing melt viscosity is impaired; in addition, the olefin polymer (D) may be removed in the plasticizer-removing process. Use of an olefin polymer (D) having an Mn greater than 10000 causes the olefin polymer (D) to be insufficiently mixed with the ultra-high molecular weight polyethylene (A) with the result that an effect of decreasing melt viscosity is impaired; hence use of such an olefin polymer (D) is not preferred.

In the present invention, the olefin polymer (D) having a polystyrene-equivalent number average molecular weight (Mn) of 500 to 10000 measured by gel permeation chromatography (GPC) can be produced using known catalysts such as a Ziegler-Natta catalyst and a metallocene catalyst; for example, the olefin polymer (D) to be used can be produced by a technique disclosed in Japanese Unexamined Patent Application Publication No. 2010-77336.

[Amount of Each Component]

The polyolefin resin composition of the present invention contains, relative to 100 parts by weight of the total of the ultra-high molecular weight ethylene polymer (A), 4-methyl-1-pentene polymer or 3-methyl-1-pentene polymer (B), and polymer of an olefin having 2 to 12 carbon atoms (C), 50 to 85 parts by weight, preferably 50 to 80 parts by weight, more preferably 50 to 70 parts by weight, and especially preferably 50 to 65 parts by weight of the ultra-high molecular weight ethylene polymer (A), 10 to 60 parts by weight, preferably 10 to 45 parts by weight, more preferably 15 to 45 parts by weight, further preferably 15 to 43 parts by weight, and especially preferably 18 to 40 parts by weight of the 4-methyl-1-pentene polymer or 3-methyl-1-pentene polymer (B), and 0.1 to 20 parts by weight, preferably 1 to 15 parts by weight, more preferably 2 to 12 parts by weight, further preferably 2.5 to 10 parts by weight, and especially preferably 2.5 to 8 parts by weight of the polymer of an olefin having 2 to 12 carbon atoms (C). In the case where two or more polymers of olefins having 2 to 12 carbon atoms (C) are used in combination, the above-mentioned amount is the total amount of all of the polymers used in combination.

At the amounts of the ultra-high molecular weight ethylene polymer (A), 4-methyl-1-pentene polymer or 3-methyl-1-pentene polymer (B), and the polymer of an olefin having 2 to 12 carbon atoms (C) within the above-mentioned ranges, a film which has excellent mechanical properties and thermal resistance and which is less likely to suffer from fisheyes can be produced, and a microporous membrane having an excellent permeability and shutdown properties in addition to these properties can be produced.

The amount of the olefin polymer (D) having a polystyrene-equivalent number average molecular weight (Mn) of 500 to 10000 measured by gel permeation chromatography (GPC), which is optionally contained in the polyolefin resin composition of the present invention, is 0.001 to 20 parts by weight, preferably 0.1 to 10 parts by weight, more preferably 1 to 7 parts by weight, and especially preferably 2 to 5 parts by weight relative to 100 parts by weight of the total of the ultra-high molecular weight ethylene polymer (A), 4-methyl-1-pentene polymer or 3-methyl-1-pentene polymer (B), the polymer of an olefin having 2 to 12 carbon atoms (C), and the olefin polymer (D) having a polystyrene-equivalent number average molecular weight (Mn) of 500 to 10000 measured by gel permeation chromatography (GPC). In the case where the polyolefin resin composition of the present invention contains the olefin polymer (D), the amounts of the ultra-high molecular weight ethylene polymer (A), 4-methyl-1-pentene polymer or 3-methyl-1-pentene polymer (B), the polymer of an olefin having 2 to 12 carbon atoms (C) in such a polyolefin resin composition are the same as in the above-mentioned case in which the total of the components (A), (B), and (C) is 100 parts by weight.

At the amount of each component, including the olefin polymer (D), of the polyolefin resin composition within the above-mentioned range, the extremely high melt viscosity of the ultra-high molecular weight polyethylene (A) can be decreased to an extent which enables kneading to be effectively carried out.

Provided that the effects of the present invention are not impaired, the polyolefin resin composition of the present invention may contain additives that are generally added to polyolefin, such as a variety of known additives, e.g., a thermal stabilizer, a weathering stabilizer, a corrosion inhibitor, a copper inhibitor, and an antistatic agent; and a flame retardant, a crosslinking agent, a crosslinking aid, an antistatic agent, a slipping agent, an anti-blocking agent, an anti-fogging agent, a lubricant, a dye, a pigment, a filler, a mineral oil-based softener, a petroleum resin, and a wax. These additives may be used alone or in combination.

[Method for Producing Polyolefin Resin Composition]

The polyolefin resin composition of the present invention can be produced through the following processes: mixing the ultra-high molecular weight ethylene polymer (A), the 4-methyl-1-pentene polymer or 3-methyl-1-pentene polymer (B), the polymer of an olefin having 2 to 12 carbon atoms (C), and optionally the olefin polymer (D) having a polystyrene-equivalent number average molecular weight (Mn) of 500 to 10000 measured by gel permeation chromatography (GPC) in amounts within the above-mentioned ranges; optionally adding an additive without the effects of the present invention being impaired; mixing the product by using a mixer, such as a Banbury mixer or a Henschel mixer, to yield a dry-blended product; and granulating or grinding the dry-blended product through melt-kneading with, for instance, a single-screw extruder, a multi-screw extruder, or a kneader. In the melt-kneading, the melting temperature is normally in the range of 160 to 300° C., and preferably 180 to 280° C.

<Various Applications of Polyolefin Resin Composition>

The polyolefin resin composition has properties such as excellent mechanical properties and thermal resistance and is thus useful as materials of films, microporous membranes, and battery separators; in particular, the polyolefin resin composition is effectively used for battery separators in, for instance, lithium secondary batteries, nickel-hydrogen batteries, nickel-cadmium batteries, and polymer batteries. Specific applications particularly useful in the present invention will now be described in detail.

<Film Formed of Polyolefin Resin Composition>

A film can be made of the polyolefin resin composition of the present invention by shaping the polyolefin resin composition into a film by known methods such as press forming, extrusion, inflation, and calendering.

In the film formed of the polyolefin resin composition of the present invention, the polymer of an olefin having 2 to 12 carbon atoms (C) serves as a compatibilizer, which prevents fisheyes from being caused by unmelted resin resulting from poor compatibility of the ultra-high molecular weight ethylene polymer (A) with the 4-methyl-1-pentene polymer or 3-methyl-1-pentene polymer (B).

The film formed of the polyolefin resin composition of the present invention can be in the form of a multilayer film made of the polyolefin resin composition and another resin, and such a multilayer film is produced by, for example, dry lamination, co-extrusion, extrusion lamination, and thermal lamination.

<Microporous Membrane Formed of Polyolefin Resin Composition>

In a microporous membrane formed of the polyolefin resin composition of the present invention, the polymer of an olefin having 2 to 12 carbon atoms (C) which is present in the polyolefin resin composition that is the material of the microporous membrane enhances the compatibility of the ultra-high molecular weight ethylene polymer (A) with the 4-methyl-1-pentene polymer or 3-methyl-1-pentene polymer (B) as in the above-mentioned film, which enables production of a microporous membrane which has an even pore size and which is less likely to suffer from fisheyes.

The presence of the olefin polymer (D) that may be optionally added enables a reduction in the melt viscosity of the ultra-high molecular weight ethylene polymer (A), so that a microporous membrane which is less likely to suffer from fisheyes can be produced; in addition, since the Mn of the olefin polymer (D) is within a predetermined range, the olefin polymer (D) remains in a produced microporous membrane, and this remaining olefin polymer (D) is expected to contribute to an enhancement in the shutdown properties of a battery separator.

The microporous membrane can be made of the polyolefin resin composition of the present invention through the following processes (a) to (d).

(a) process of preparing a polyolefin composition through melt-kneading the polyolefin resin composition and a plasticizer (b) process of forming a gel sheet through extruding the polyolefin composition from a die and cooling the extruded polyolefin composition (c) process of stretching and removing the plasticizer (d) process of drying and heating the formed membrane.

Each process will now be described.

(a) Process for Preparing Polyolefin Composition

The polyolefin resin composition and a plasticizer are melt-kneaded to prepare a polyolefin composition suitable for a microporous membrane, especially for a battery separator.

Known plasticizers can be used provided that they are in the form of a liquid or in the form of a solid which can be turned into a liquid at high temperature and provided that they can be extracted with a washing solvent which will be described later.

Use of a plasticizer which is in the form of a liquid at room temperature, for example, is likely to enable stretching at a relatively high stretch ratio. Examples of such a liquid plasticizer which can be used include, but are not limited to, aliphatic or cyclic hydrocarbons, such as nonane, decane, decalin, paraxylene, undecane, dodecane, and liquid paraffin;

mineral oil fractions having boiling points corresponding to those of these hydrocarbons; and phthalic acid esters which are in the form of a liquid at room temperature, such as dibutyl phthalate and dioctyl phthalate. In order to form a gel sheet having a stable concentration of the liquid plasticizer, a non-volatile liquid plasticizer such as liquid paraffin is preferably used. In the present invention, a plasticizer which is in the form of a solid and which can be turned into a liquid at high temperature is also preferably used. A plasticizer which is miscible with the polyolefin resin composition in a state in which they are melt-kneaded under heating but which is in the form of a solid at room temperature may be mixed with the liquid plasticizer. Examples of such plasticizers include paraffin wax which is in the form of a solid at normal temperature and higher aliphatic alcohols such as stearyl alcohol and ceryl alcohol.

In the present invention, the number average molecular weight (Mn) of the plasticizer depends on the types of materials to be used but is outside the above-described range of the Mn of the olefin polymer (D).

The melt-kneading can be carried out by any technique; however, the components are normally homogeneously kneaded with a twin-screw extruder. This technique is suitable for preparing a high-concentration polyolefin solution. The melting temperature is normally in the range of 160 to 300° C., and preferably 180 to 280° C.

In the polyolefin composition, the amount of the polyolefin resin composition relative to the amount of the plasticizer is in the range of 1 to 50 parts by weight, and preferably 20 to 40 parts by weight provided that the total amount of the polyolefin resin composition and the plasticizer is 100 parts by weight.

(b) Process of Forming Sheet

The polyolefin composition obtained by the melt-kneading is extruded from a die directly or through another extruder, or the extruded polyolefin composition is cooled once, formed into pellets, and then extruded again from a die through an extruder. A sheet die is normally used as the die, but a double cylindrical hollow die, an inflation die, or another die can be also used. The melting temperature in the extruding is normally in the range of 140 to 280° C.

The solution extruded from the die in this manner is cooled to produce a shaped product. Through this process, a phase separation structure in which the polyolefin phase has been separated by the plasticizer in a micro phase can be fixed. The shaped product is preferably in the form of a gel.

(c) Process of Stretching and Removing Plasticizer

Subsequently, the produced sheet is stretched, and then the liquid solvent is extracted to be removed; the liquid solvent is extracted to be removed from the sheet, and then the sheet is stretched; or the sheet is stretched, the liquid solvent is extracted to be removed, and then the sheet is further stretched. The sheet is preferably in the form of a gel.

The sheet is heated and then stretched at an intended stretch ratio by typical techniques such as a technique involving use of a tenter, rolling, inflation, calendering, or a combination thereof. The stretching may be either uniaxial stretching or biaxial stretching, and biaxial stretching is preferred. The biaxial stretching may be any of simultaneous biaxial stretching, sequential stretching, and multi-stage stretching (for example, combination of simultaneous biaxial stretching and sequential stretching); in particular, simultaneous biaxial sequential is preferred. The stretching enhances mechanical strength.

The stretch ratio varies on the basis of the thickness of the sheet; in the case of uniaxial stretching, the stretch ratio is preferably at least 2 times, and more preferably 3 to 30 times. In the case of biaxial stretching, the stretch ratio is at least 3 times in each direction, and the area magnification is preferably at least 9 times, and more preferably at least 25 times. The area magnification of at least 9 times enables an enhancement in puncture strength. The temperature in the stretching is normally in the range of 100 to 140° C., and preferably 110 to 120° C.

For the removal (washing away) of the plasticizer, a washing solvent is used. Since the polyolefin is phase-separated from the plasticizer, removal of the plasticizer by extraction leads to production of a porous membrane. The removal (washing away) of the plasticizer can be carried out using known washing solvents. Examples of the known washing solvents include chlorinated hydrocarbons such as methylene chloride and carbon tetrachloride; hydrocarbons such as pentane, hexane, and heptane; fluorinated hydrocarbons such as trifluoroethane; ethers such as diethyl ether and dioxane; and easy-volatile solvents such as methyl ethyl ketone.

The plasticizer can be washed away by, for example, a technique in which the stretched membrane or sheet is immersed in a washing solvent, a technique in which the stretched membrane or sheet is showered with a washing solvent, or a combination thereof. The plasticizer is preferably washed away with a washing solvent until the amount of the residual plasticizer reaches less than 1 part by weight relative to the amount of the added plasticizer.

(d) Process of Drying Membrane

The membrane produced through the above-mentioned stretching and removal of the plasticizer can be dried by heating or air drying. The drying temperature is preferably not more than the temperature at which crystalline dispersion of the ultra-high molecular weight ethylene polymer (A) occurs, and especially preferably lower than this crystal dispersion temperature by at least 5° C.

The membrane may be dried without the effects of the present invention being impaired by the drying; the amount of the washing solvent remaining in the macroporous membrane is preferably not more than 5 parts by weight, and more preferably not more than 3 parts by weight relative to 100 parts by weight of the dried membrane. In the case where the drying is insufficient with the result that the washing solvent excessively remains in the membrane, the porosity is lowered in the subsequent heat setting, which impairs the permeability; hence, such a case is unacceptable.

After the dying, in order to prevent the shrink of the microporous membrane in the stretching direction due to the residue of stress which has acted during the stretching, heat setting is preferably carried out. The temperature in the heat setting is preferably 80° C. or more and less than 160° C. Examples of the heat setting includes a technique in which dried film is thermally shrunk such that the length of the microporous membrane is reduced by 10 to 50% through the heat setting (this technique is hereinafter referred to as "relaxation") and a technique in which heat setting is carried out such that the dimension in the stretching direction is not changed.

The microporous membrane formed of the polyolefin resin composition through the above-mentioned processes has a meltdown temperature of not less than 160° C. and the number of fisheyes of not more than 100 per 1000×1000 mm$^2$, preferably not more than 50 per 1000×1000 mm$^2$, which shows that the microporous membrane has both an excellent thermal resistance and appearance.

In the case where the olefin polymer (D) used to produce the microporous membrane is remaining in the microporous membrane and where the microporous membrane is used as a separator, the micro pores thereof are closed even at low temperature, so that an effect of further lowering the shutdown temperature of a battery separator formed of such a microporous membrane can be therefore expected; hence, such a microporous membrane is preferred. The acceptable amount of the olefin polymer (D) remaining in the microporous membrane ranges from 0.5 to 5 weight %, preferably 0.8 to 3 weight %, and more preferably 1 to 2 weight %. The amount of the residual olefin polymer (D) is determined as follows: the microporous membrane is subjected to extraction with a methylene chloride solution at 55° C., the obtained liquid is concentrated and evaporated, and the weight of the extracted material is measured to obtain the weight ratio of the extracted material to the microporous membrane before the extraction.

<Battery Separator Made of Microporous Membrane>

In the battery separator made of the microporous membrane formed of the polyolefin resin composition of the present invention, the temperature at which pores are closed (shutdown temperature) is not more than 140° C., the temperature at which the membrane is broken (meltdown temperature) is not less than 160° C., and the difference between the meltdown temperature and the shutdown temperature is not less than 25° C.; thus, such a battery separator has significantly high safety as compared with conventional battery separators.

The microporous membrane of the present invention has excellent properties as described above.

Hence, the battery separator of the present invention is very useful in terms of safety and therefore particularly suitable for separators used in lithium batteries. In addition to excellent thermal resistance in which the meltdown temperature is not less than 160° C., the number of fisheyes is small: not more than 100 per 1000×1000 mm$^2$, and preferably not more than 50 per 1000×1000 mm$^2$. The pores are therefore opened at high uniformity. Thus, the problematic fisheyes of traditional microporous membranes made of a composition containing polyethylene and polymethylpentene are greatly reduced, and suppression of uneven ion conductivity in the electric charge and discharge of a battery leads to a great reduction in a fear in which dendrite is accumulated to break the microporous membrane.

EXAMPLES

The present invention will now be further specifically described with reference to Examples. The present invention should not be limited to, for instance, Examples. In Examples and Comparative Examples, physical properties were measured by the following methods.

[Intrinsic Viscosity [η]]

Intrinsic viscosity was measured in decalin at 135° C. in accordance with ASTM D4020 and defined as [η].

[MFR]

The 4-methyl-1-pentene polymer or 3-methyl-1-pentene polymer (B) was subjected to analysis at a load of 5.0 kg and 260° C. in accordance with ASTM D1238.

The polymer of an olefin having 2 to 12 carbon atoms (C) was subjected to analysis at a load of 2.16 kg and 190° C. in accordance with ASTM D1238.

[Melting Point]

Analysis was carried out under nitrogen flow at a temperature rising rate of 10° C./min with a Diamond DSC manufactured by PerkinElmer Inc., and the peak top of the melting peak was determined as a melting point.

[Number Average Molecular Weight (Mn)]

The number average molecular weight (Mn) of the olefin polymer (D) was measured as follows.

Liquid chromatograph: Alliance type-GPC2000 manufactured by Waters Corp.
Columns: four TSKgel columns manufactured by TOSOH CORPORATION
Mobile phase medium: o-dichlorobenzene
Flow rate: 1.0 ml/min
Measurement temperature: 140° C.
Formation of calibration curve: based on a standard polystyrene sample
Sample concentration: 0.15 mg/mL
Analysis was carried out under these conditions, and the obtained chromatogram was analyzed by known methods to calculate Mn.

[Monomer Composition]

The components (B), (C), and (D) were subjected to $^{13}$C-NMR for quantitative analysis of the monomer units contained therein.

The analysis was carried out with a nuclear magnetic resonance apparatus ECP500 manufactured by JEOL Ltd. under the following conditions: solvent: mixed solvent of o-dichlorobenzene/deuterated benzene (80/20 volume %), sample concentration: 55 mg/0.6 mL, measurement temperature: 120° C., nucleus to be observed: $^{13}$C (125 MHz), sequence: single pulse with proton decoupling, pulse duration: 4.7 μsec (45° pulse), repetition time: 5.5 seconds, integration: more than 10000 times, and standard value of chemical shift: 27.50 ppm.

[Meltdown Temperature]

Microporous membranes produced in Examples and Comparative Examples were fixed to round metal holders having a diameter of 25 mm and then immersed in an oil bath at a predetermined temperature for 2 minutes to observe a temperature at which the microporous membranes were broken.

[Fisheyes]

The number of fisheyes in a microporous membrane per an area of 1000 mm×1000 mm was visually observed.

[Amount of Residual Olefin Polymer (D)]

Microporous membranes produced in Examples and Comparative Examples were weighed to 10 g and then subjected to Soxhlet extraction with a methylene chloride solution at 55° C. for 4 hours under reflux. The extract was concentrated and evaporated, and the weight of the residual substance was measured. Then, the weight ratio (%) of the residual substance to the microporous membrane before this analysis was determined as the amount of the residual olefin polymer (D).

[Gurley Air Permeability]

Analysis was carried out at 23° C. with a Gurley permeability tester (manufactured by Toyo Seiki Seisaku-sho, Ltd.) in accordance with JIS P-8117.

[Thickness of Microporous Membrane]

Arbitrary 25 points on the plane of a microporous membrane produced in each of Examples and Comparative Examples were subjected to analysis with a 1/1000 mm dial gauge, and the average of the obtained values was determined as the thickness of the microporous membrane.

[Puncture Strength]

A microporous membranes produced in Examples and Comparative Examples were pierced with a needle having a round tip (radius of curvature R: 0.5 mm) and a diameter of 1 mm at a rate of 2 mm/sec, and the maximum load in the piercing was measured.

[Tensile Strength]

A strip-shaped sample having a width of 10 mm was taken from a microporous membrane produced in each of Examples and Comparative Examples, and the tensile strength of the sample was measured in both an MD direction (machine direction) and a TD direction (transverse direction) in accordance with ASTM D882.

[Material Used]

Ultra-High Molecular Weight Ethylene Polymer (A)

(A-1) Ultra-high molecular weight ethylene homopolymer: [η]=5 dl/g and melting point of 136° C.

(A-2) Ultra-high molecular weight ethylene homopolymer: [η]=7 dl/g and melting point of 136° C.

4-methyl-1-pentene polymer or 3-methyl-1-pentene polymer (B)

(B-1) 4-methyl-1-pentene.1-decene copolymer: 1-decene content of 2.4 weight %, MFR=7 g/10 min, and melting point of 235° C.

Polymer of Olefin Having 2 to 12 Carbon Atoms (C)

(C-1) Propylene homopolymer: MFR=0.5 g/10 min and melting point of 164° C.

(C-2) Ethylene butene copolymer: molar ratio of ethylene/butene=85/15 and MFR=0.8 g/10 min (C-3) Ethylene.propylene copolymer: molar ratio of ethylene/propylene=40/60 and MFR=0.7 g/10 min (C-4) Ethylene butene copolymer: molar ratio of ethylene/butene=5/95 and MFR=1.5 g/10 min (C-5) Ethylene.4-methyl-1-pentene copolymer: molar ratio of ethylene/4-methyl-1-pentene=65/35 and MFR=0.5 g/10 min Olefin Polymer (D)

(D-1) Ethylene.propylene copolymer: molar ratio of ethylene/propylene=90/10 and number average molecular weight of 5000

(D-2) Ethylene.propylene copolymer: molar ratio of ethylene/propylene=95/5 and number average molecular weight of 1500

(D-3) Ethylene homopolymer: number average molecular weight of 400

Example 1

A resin composition was prepared by dry-blending 60 parts by weight of the (A-1) ultra-high molecular weight ethylene homopolymer, 30 parts by weight of the (B-1) 4-methyl-1-pentene.1-decene copolymer, 5 parts by weight of the (C-1) propylene homopolymer, and 5 parts by weight of the (D-1) ethylene.propylene copolymer.

The resin composition and liquid paraffin (Mn=350) were kneaded at a weight ratio of 30/70 and 240° C. with a twin-screw extruder. The kneaded product was thermally pressed at 240° C. into a sheet having a thickness of 1 mm and then simultaneously biaxially stretched to 6×6 times at 125° C. with a batch-type biaxial stretching apparatus. After the stretching, the liquid paraffin was extracted with hexane, and the resulting product was dried at room temperature and then thermally fixed at 100° C. for 10 minutes to yield a microporous membrane. The meltdown temperature of such a microporous membrane was 170° C., and the number of fisheyes per an area of 1000 mm×1000 mm in the microporous membrane was 48. The amount of the residual (D-1) ethylene.propylene copolymer measured through Soxhlet extraction was 1.8 weight %.

Example 2

The amount of the (A-1) ultra-high molecular weight ethylene homopolymer was changed to 64 parts by weight, the amount of the (C-1) propylene homopolymer was changed to 3 parts by weight, and the amount of the (D-1) ethylene.propylene copolymer was changed to 3 parts by weight. Except for these changes, a microporous membrane was produced as in Example 1. The meltdown temperature of such a microporous membrane was 170° C., and the number of fisheyes per an area of 1000 mm×1000 mm in the microporous membrane was 46. The amount of the residual (D-1) ethylene.propylene copolymer was 1.2 weight %.

Example 3

Except that 5 parts by weight of the (C-2) ethylene.butene copolymer was used in place of 5 parts by weight of the (C-1) propylene homopolymer, a microporous membrane was produced as in Example 1. The meltdown temperature of such a microporous membrane was 165° C., and the number of fisheyes per an area of 1000 mm×1000 mm in the microporous membrane was 44. The amount of the residual (D-1) ethylene.propylene copolymer was 1.7 weight %.

Example 4

Except that 2.5 parts by weight of the (C-1) propylene homopolymer and 2.5 parts by weight of the (C-2) ethylene.butene copolymer were used in combination in place of 5 parts by weight of the (C-1) propylene homopolymer, a microporous membrane was produced as in Example 1. The meltdown temperature of such a microporous membrane was 160° C., and the number of fisheyes per an area of 1000 mm×1000 mm in the microporous membrane was 45. The amount of the residual (D-1) ethylene.propylene copolymer was 1.8 weight %.

Example 5

The amount of the (A-1) ultra-high molecular weight ethylene homopolymer was changed to 70 parts by weight, and the amount of the (B-1) 4-methyl-1-pentene.1-decene copolymer was changed to 20 parts by weight. Except for these changes, a microporous membrane was produced as in Example 4. The meltdown temperature of such a microporous membrane was 160° C., and the number of fisheyes per an area of 1000 mm×1000 mm in the microporous membrane was 43. The amount of the residual (D-1) ethylene.propylene copolymer was 1.8 weight %.

Example 6

The amount of the (A-1) ultra-high molecular weight ethylene homopolymer was changed to 50 parts by weight, and the amount of the (B-1) 4-methyl-1-pentene.1-decene copolymer was changed to 40 parts by weight. Except for these changes, a microporous membrane was produced as in Example 4. The meltdown temperature of such a microporous membrane was 175° C., and the number of fisheyes per an area of 1000 mm×1000 mm in the microporous membrane was 48. The amount of the residual (D-1) ethylene.propylene copolymer was 1.8 weight %.

Example 7

Except that 2.5 parts by weight of the (C-1) propylene homopolymer, 1.25 parts by weight of the (C-3) ethylene.propylene copolymer, and 1.25 parts by weight of the (C-4) ethylene.butene copolymer were used in combination in place of 5 parts by weight of the (C-1) propylene homopolymer, a microporous membrane was produced as in Example 1. The meltdown temperature of such a microporous membrane was 160° C., and the number of fisheyes per an area of 1000 mm×1000 mm in the microporous membrane was 42. The amount of the residual (D-1) ethylene.propylene copolymer was 1.8 weight %.

Example 8

The amount of the (A-1) ultra-high molecular weight ethylene homopolymer was changed to 65 parts by weight, 2.5 parts by weight of the (C-5) ethylene.4-methyl-1-pentene copolymer was used in place of 5 parts by weight of the (C-1) propylene homopolymer, and the amount of the (D-1) ethylene.propylene copolymer was changed to 2.5 parts by weight. Except for these changes, a microporous membrane was produced as in Example 1. The meltdown temperature of such a microporous membrane was 165° C., and the number of fisheyes per an area of 1000 mm×1000 mm in the microporous membrane was 35. The amount of the residual (D-1) ethylene.propylene copolymer was 1.1 weight %.

Example 9

The amount of the (A-1) ultra-high molecular weight ethylene homopolymer was changed to 65 parts by weight, and the (D-1) ethylene.propylene copolymer was not used. Except for these changes, a microporous membrane was produced as in Example 1. The meltdown temperature of such a microporous membrane was 165° C., and the number of fisheyes per an area of 1000 mm×1000 mm in the microporous membrane was 85.

Example 10

Except that 5 parts by weight of the (D-2) ethylene.propylene copolymer was used in place of 5 parts by weight of the (D-1) ethylene.propylene copolymer, a microporous membrane was produced as in Example 1. The meltdown temperature of such a microporous membrane was 170° C., and the number of fisheyes per an area of 1000 mm×1000 mm in the microporous membrane was 45. The amount of the residual (D-2) ethylene.propylene copolymer was 1.7 weight %.

Example 11

Except that 5 parts by weight of the (D-3) ethylene homopolymer was used in place of 5 parts by weight of the (D-1) ethylene.propylene copolymer, a microporous membrane was produced as in Example 1. The meltdown temperature of such a microporous membrane was 165° C., and the number of fisheyes per an area of 1000 mm×1000 mm in the microporous membrane was 89. The amount of the residual (D-3) ethylene homopolymer was 0.1 weight %.

Example 12

Except that 60 parts by weight of the (A-2) ultra-high molecular weight ethylene homopolymer was used in place of 60 parts by weight of the (A-1) ultra-high molecular weight ethylene homopolymer, a microporous membrane was produced as in Example 1. The meltdown temperature of such a microporous membrane was 165° C., and the number of fisheyes per an area of 1000 mm×1000 mm in the microporous membrane was 49. The amount of the residual (D-1) ethylene.propylene copolymer was 1.7 weight %.

Comparative Example 1

Except that only the (A-1) ultra-high molecular weight ethylene homopolymer was used, a microporous membrane was produced as in Example 1. The meltdown temperature of such a microporous membrane was 150° C., and the number of fisheyes per an area of 1000 mm×1000 mm in the microporous membrane was 33.

Comparative Example 2

A resin composition was prepared by dry-blending 70 parts by weight of the (A-1) ultra-high molecular weight ethylene homopolymer and 30 parts by weight of the (B-1) 4-methyl-1-pentene.1-decene copolymer. The resin composition was used to produce a microporous membrane as in Example 1. The meltdown temperature of such a microporous membrane was 165° C., and the number of fisheyes per an area of 1000 mm×1000 mm in the microporous membrane was 144.

TABLE 1

| | | Example 1 | Example 2 | Example 3 | Example 4 | Example 5 | Example 6 | Example 7 | Example 8 |
|---|---|---|---|---|---|---|---|---|---|
| Ultra-high molecular weight ethylene polymer (A) | (A-1) Ultra-high molecular weight ethylene homopolymer [η] = 5 dl/g | 60 | 64 | 60 | 60 | 70 | 50 | 60 | 65 |
| | (A-2) Ultra-high molecular weight ethylene homopolymer [η] = 7 dl/g | | | | | | | | |
| (B-1) 4-methyl-1-pentene-1-decene copolymer 1-decene content: 2.4 mass %, MFR = 7 g/10 min | | 30 | 30 | 30 | 30 | 20 | 40 | 30 | 30 |
| Polymer of α-olefin having 2 to 12 carbon atoms (C) | (C-1) Propylene homopolymer (MFR = 0.5 g/10 min) | 5 | 3 | | 2.5 | 2.5 | 2.5 | 2.5 | |
| | (C-2) Ethylene/butene copolymer molar ratio = 85/15, MFR = 0.8 g/10 min | | | 5 | 2.5 | 2.5 | 2.5 | | |
| | (C-3) Ethylene/propylene copolymer molar ratio = 40/60, MFR = 0.7 g/10 min | | | | | | | 1.25 | |
| | (C-4) Ethylene/butene copolymer molar ratio = 5/95, MFR = 1.5 g/10 min | | | | | | | 1.25 | |
| | (C-5) Ethylene/4-methyl-1-pentene copolymer molar ratio = 65/35, MFR = 0.5 g/10 min | | | | | | | | 2.5 |
| Olefin polymer (D) | (D-1) Ethylene-propylene copolymer molar ratio = 90/10, number average molecular weight = 5000 | 5 | 3 | 5 | 5 | 5 | 5 | 5 | 2.5 |
| | (D-2) Ethylene-propylene copolymer molar ratio = 95/5, number average molecular | | | | | | | | |

TABLE 1-continued

|  |  | Ex 1 | Ex 2 | Ex 3 | Ex 4 | Ex 5 | Ex 6 | Ex 7 | Ex 8 |
|---|---|---|---|---|---|---|---|---|---|
|  | weight = 1500 (D-3) Ethylene homopolymer (number average molecular weight = 400) |  |  |  |  |  |  |  |  |
| Meltdown temperature | °C. | 170 | 170 | 165 | 160 | 160 | 175 | 160 | 165 |
| Fisheyes | Number/1000 × 1000 mm² | 48 | 46 | 44 | 45 | 43 | 48 | 42 | 35 |
|  | Relative value based on assumption that value in Comparative Example 2 is 1 | 0.33 | 0.32 | 0.31 | 0.31 | 0.30 | 0.33 | 0.29 | 0.24 |
| Thickness | µm | 23 | 21 | 19 | 20 | 21 | 22 | 18 | 19 |
| Tensile strength in MD direction | MPa | 90 | 92 | 93 | 88 | 102 | 82 | 89 | 92 |
| Tensile strength in TD direction | MPa | 88 | 96 | 88 | 92 | 101 | 79 | 91 | 95 |
| Puncture strength | gf/µm | 21 | 23 | 21 | 22 | 24 | 19 | 20 | 20 |
| Gurley air permeability | Sec/100 cc | 280 | 250 | 230 | 240 | 240 | 260 | 220 | 230 |
| Amount of residual olefin polymer (D) | Weight % | 1.8 | 1.2 | 1.7 | 1.8 | 1.8 | 1.8 | 1.8 | 1.1 |

|  |  | Example 9 | Example 10 | Example 11 | Example 12 | Comparative Example 1 | Comparative Example 2 |
|---|---|---|---|---|---|---|---|
| Ultra-high molecular weight ethylene polymer (A) | (A-1) Ultra-high molecular weight ethylene homopolymer [η] = 5 dl/g | 65 | 60 | 60 |  | 100 | 70 |
|  | (A-2) Ultra-high molecular weight ethylene homopolymer [η] = 7 dl/g |  |  |  | 60 |  |  |
|  | (B-1) 4-methyl-1-pentene-1-decene copolymer 1-decene content: 2.4 mass %, MFR = 7 g/10 min | 30 | 30 | 30 | 30 |  | 30 |
| Polymer of α-olefin having 2 to 12 carbon atoms (C) | (C-1) Propylene homopolymer (MFR = 0.5 g/10 min) | 5 | 5 | 5 |  |  |  |
|  | (C-2) Ethylene/butene copolymer molar ratio = 85/15, MFR = 0.8 g/10 min |  |  |  | 5 |  |  |
|  | (C-3) Ethylene/propylene copolymer molar ratio = 40/60, MFR = 0.7 g/10 min |  |  |  |  |  |  |
|  | (C-4) Ethylene/butene copolymer molar ratio = 5/95, MFR = 1.5 g/10 min |  |  |  |  |  |  |
|  | (C-5) Ethylene/4-methyl-1-pentene copolymer molar ratio = 65/35, MFR = 0.5 g/10 min |  |  |  |  |  |  |
| Olefin polymer (D) | (D-1) Ethylene-propylene copolymer molar ratio = 90/10, number average molecular weight = 5000 |  |  |  | 5 |  |  |
|  | (D-2) Ethylene-propylene copolymer molar ratio = 95/5, number average molecular weight = 1500 |  | 5 |  |  |  |  |
|  | (D-3) Ethylene homopolymer (number average molecular weight = 400) |  |  | 5 |  |  |  |
| Meltdown temperature | °C. | 165 | 170 | 165 | 165 | 150 | 165 |
| Fisheyes | Number/1000 × 1000 mm² | 85 | 45 | 89 | 49 | 33 | 144 |
|  | Relative value based on assumption that value in Comparative Example 2 is 1 | 0.59 | 0.31 | 0.62 | 0.34 | 0.23 | 1 |
| Thickness | µm | 21 | 20 | 22 | 21 | 19 | 20 |
| Tensile strength in MD direction | MPa | 94 | 93 | 84 | 98 | 129 | 82 |
| Tensile strength in TD direction | MPa | 92 | 94 | 82 | 92 | 132 | 85 |
| Puncture strength | gf/µm | 22 | 23 | 21 | 23 | 26 | 21 |
| Gurley air permeability | Sec/100 cc | 250 | 230 | 270 | 260 | 220 | 240 |
| Amount of residual olefin polymer (D) | Weight % | 0 | 1.7 | 0.1 | 1.7 | 0 | 0 |

Industrial Applicability

The polyolefin resin composition of the present invention has excellent mechanical properties and thermal resistance and therefore can be suitably used for production of, for instance, a film and microporous membrane. Furthermore, a film can be made of the resin composition through a simple process for forming a monolayer film, and such a film has excellent mechanical properties and thermal resistance and is less likely to suffer from fisheyes. Moreover, a microporous membrane formed of the polyolefin resin composition has, in addition to the above-mentioned film properties, excellent permeability and shutdown properties and thus can be particularly used as a battery separator.

As described above, the polyolefin resin composition of the present invention has a significantly high industrial practicality.

The invention claimed is:

1. A polyolefin resin composition comprising:
   (i) 50 to 85 parts by weight of an ultra-high molecular weight ethylene polymer (A) having a intrinsic viscosity [η] of 3.5 to 35 dl/g, the intrinsic viscosity [η] being measured in decalin at 135° C. in accordance with ASTM D4020;
   (ii) 10 to 60 parts by weight of a 4-methyl-1-pentene polymer or 3-methyl-1-pentene polymer (B); and
   (iii) 0.1 to 20 parts by weight of a polymer of an olefin having 2 to 12 carbon atoms (C) selected from a group of a homopolymer of one olefin selected from olefins having 2 to 12 carbon atoms and a copolymer of two or more olefins selected from olefins having 2 to 12 carbon atoms, the polymer (C) being different from polymers selected as the ultra-high molecular weight ethylene polymer (A) and the polymer (B) (the total of (A), (B), and (C) is 100 parts by weight) and
further comprising 0.001 to 20 parts by weight of an olefin polymer (D) relative to 100 parts by weight of the total of (A), (B), (C), and (D), the olefin polymer (D) having a number average molecular weight (Mn) of 500 to 10000 measured by gel permeation chromatography (GPC) and being different from polymers selected as the ultra-high molecular weight ethylene polymer (A), the polymer (B), and polymer of an olefin having 2 to 12 carbon atoms (C).

2. The polyolefin resin composition according to claim 1, wherein the amount of the ultra-high molecular weight ethylene polymer (A) is 50 to 85 parts by weight, the amount of the 4-methyl-1-pentene polymer or 3-methyl-1-pentene polymer (B) is 10 to 45 parts by weight, and the amount of the polymer of an olefin having 2 to 12 carbon atoms (C) is 0.1 to 20 parts by weight, the polymer (C) being different from polymers selected as the ultra-high molecular weight ethylene polymer (A) and the polymer (B) (the total of (A), (B), and (C) is 100 parts by weight).

3. The polyolefin resin composition according to claim 1, wherein the MFR of the polymer of an olefin having 2 to 12 carbon atoms (C) ranges from 0.001 to 20 g/10 min, the MFR being measured at a load of 2.16 kg and 190° C. in accordance with ASTM D1238.

4. A film formed of the polyolefin resin composition according to claim 1.

5. A microporous membrane formed of the polyolefin resin composition according to claim 1.

6. A battery separator formed of the microporous membrane according to claim 5.

7. The polyolefin resin composition according to claim 2, wherein the MFR of the polymer of an olefin having 2 to 12 carbon atoms (C) ranges from 0.001 to 20 g/10 min, the MFR being measured at a load of 2.16 kg and 190° C. in accordance with ASTM D1238.

8. A film formed of the polyolefin resin composition according to claim 2.

9. A film formed of the polyolefin resin composition according to claim 7.

10. A microporous membrane formed of the polyolefin resin composition according to claim 2.

11. A battery separator formed of the microporous membrane according to claim 10.

12. A microporous membrane formed of the polyolefin resin composition according to claim 7.

13. A battery separator formed of the microporous membrane according to claim 12.

* * * * *